UNITED STATES PATENT OFFICE.

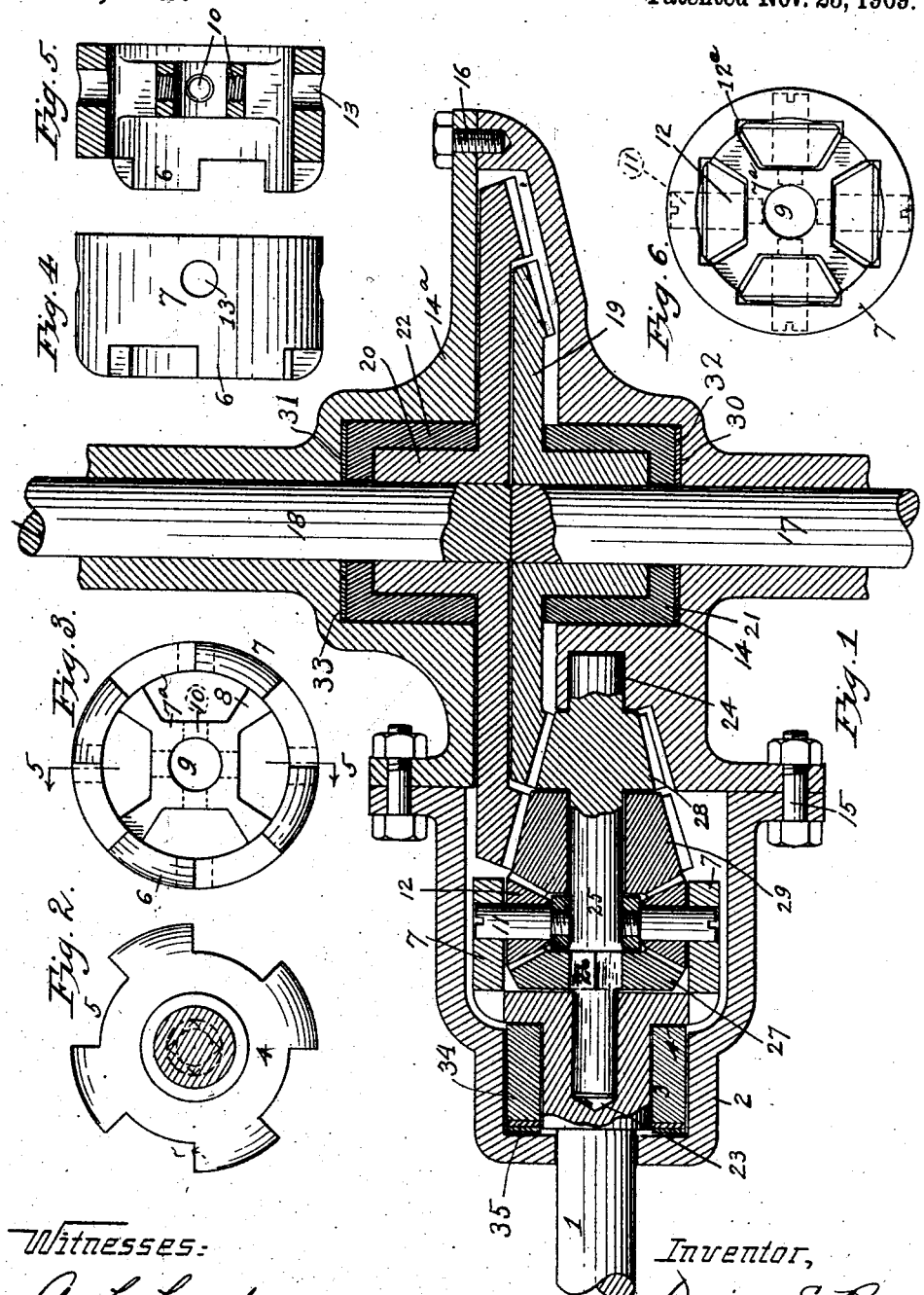

DAVID E. ROSS, OF BROOKSTON, INDIANA, ASSIGNOR TO ROSS GEAR AND TOOL COMPANY, OF LA FAYETTE, INDIANA, A CORPORATION OF INDIANA.

DIFFERENTIAL MECHANISM.

941,101.  Specification of Letters Patent.  Patented Nov. 23, 1909.

Application filed April 24, 1905. Serial No. 257,255.

*To all whom it may concern:*

Be it known that I, DAVID E. ROSS, residing at Brookston, in the county of White and State of Indiana, have invented a certain new and useful Improvement in Differential Mechanism, of which the following is a full, clear, and exact description, reference being had to the accompanying drawings.

My invention relates to differential or compensating mechanism and has for its object the construction of mechanism of this character that shall be simple, easily accessible for purposes of removal or inspection, and that shall employ two driving members or gears that are at all times in engagement with their driven members or gears, instead of employing only one such driving member or gear as is the case with mechanisms of this type in general use.

A further object of the invention is to revolve the differential or compensating gears or pinions orbitally by and at the speed of the power or drive shaft, permitting the employment of gears or pinions of very light construction.

Generally speaking, the invention may be defined as consisting of the combinations of elements embodied in the claims hereto annexed.

Referring to the drawings:—Figure 1 represents a longitudinal sectional view showing my invention; Fig. 2 represents a sectional elevation of the rear end of the power or driving shaft; Fig. 3 represents a front elevation of the cage which carries the beveled pinions of the compensating gear; Fig. 4 represents a side elevation of such cage; Fig. 5 represents a vertical sectional view of the same; and Fig. 6 represents a rear elevation of such cage, showing the beveled pinions in place therein.

The power or driving shaft 1 extends through the wall of the cap or casing 2. Adjacent to the front wall of said casing, the said shaft is enlarged at 3 and such enlarged portion is provided at the rear end thereof with a flange 4. This flange, as appears more particularly in Figs. 1 and 2, is provided with a suitable number of cut-out portions 5 which receive corresponding projections 6 on a cage 7. This cage is provided with an internal bushing 7ª rigidly connected with the interior of the cage by the arms 8. Said bushing is provided with a circular bore 9, for a purpose to be hereinafter described, and with threaded openings 10 for the studs 11 on which the beveled pinions 12 are rotatably mounted. The outer ends of the studs 11 are supported by the cage 7, said outer ends extending into recesses 13 therein. The cage may be cut out at 12ª to accommodate the pinions 12 and permit the rotation of such pinions on their studs. The rear end of the casing 2 is removably secured to the two-part casing 14, 14ª, as by bolts 15. The casing sections 14, 14ª are removably secured together as by any desired number of bolts 16. Each of the casing sections 14, 14ª is provided with a bore, at right angles to the direction of the shaft 1, for the reception of the two shaft sections 17 and 18. The shaft sections carry the driven members 19, 20, said members being shown as beveled gears of different size, the gear 19 on the shaft section 17 being the smaller. The casing sections 14, 14ª are provided with bearings 21, 22 respectively for the hubs of the gears 19 and 20 respectively.

The rear or inner end of the shaft 1 is provided with a central cylindrical recess 23 in alinement with a similar recess 24 preferably provided in the casing section 14. A shaft 25 is supported in these recesses, which form bearings for said shaft. Immediately to the rear of the flange 4, the shaft 25 is provided with a squared section 26 on which is fitted the beveled gear 27. In front of the bearing 24, the shaft 25 is provided with a beveled gear 28, said gear being rigid with the shaft and preferably integral therewith. Immediately in front of said gear is mounted the two-faced beveled gear 29, said last-mentioned gear being larger than the gear 28 and being journaled on the shaft 25. The gears 27 and 29 correspond, in their relation to the beveled pinions 12, to the driven gears or members ordinarily employed with such pinions, having their opposite inclined faces provided with beveled gear teeth with which the said pinions mesh. The bushing 7ª is sleeved on the shaft 25 between the gears 27 and 29. The length of the portion of the shaft 25 between the flange 4 and the gear 28, the lengths of the gears 27 and 29 and the sleeve or bushing 7ª, and the size of the pinions 12 are such that the pinions are maintained in mesh with the oppositely arranged teeth on the gears 27 and 29. The gear 28 bears the same proportion to the gear 19 as does the gear on the outer face of the gear 29 to the gear 20.

With the parts constructed as above described, the operation is as follows:—Power being applied to the shaft 1, the movement of the same is transmitted through the flange 4, cage 7, compensating pinions 12, gear 27, shaft 25, driving member 28, and driven member 19 to the shaft section 17; also through the flange 4, cage 7, pinions 12, driving member 29 and driven member 20 to the shaft section 18. As previously stated, the ratio of the driving member 28 to the driven member 19 is the same as the ratio of the exterior gear on the driving member 29 to the driven member 20, resulting in driving both shaft sections 17 and 18 normally at the same speed. Should the resistance offered by one of the shaft sections be greater than that offered by the other, the compensating mechanism operates in the usual manner to rotate the section offering the less resistance at the greater rate of speed.

It will be observed that, by my construction, access may be easily obtained to the various members of my differential mechanism. By unscrewing the bolts 15, the cap or casing 2 may be withdrawn and ready access afforded to the cage 7, pinions 12, shaft 25, and gears thereon. By unscrewing the bolts 16, the casing sections 14 and 14$^a$ may be disconnected, permitting inspection of the members 19 and 20.

Through the flange 4 and cage 7, the compensating pinions 12 are carried by the power or drive shaft and are orbitally revolved at the speed of such shaft, rendering possible the use of very light compensating mechanism. Moreover, the two driving members or pinions 28, 29 are always in mesh with their respective driven members, thereby lessening the strain that would be sustained by a single driving member or pinion. While I have shown the cage 7 as removably fitted to the shaft 1, through the projections 6 interlocking with the projections on the flange 4, it is evident that, so far as the idea of revolving the compensating pinions at the speed of the power shaft is concerned, the cage may be integral with said flange.

As there is necessarily more or less wear of the gears, I provide simple and effective means for adjusting said gears to compensate for such wear. The recesses 30 and 31 in the casing sections 14, 14$^a$ respectively are of sufficient depth to permit the insertion of one or more washers 32, 33 therein between the bodies of said sections and the adjacent ends of the bearings 21, 22. By removing a washer or washers from beneath the bearing 21 and inserting a washer or washers above the bearing 22, it will be evident that, by tightening the bolts 16, the driven gears 19 and 20 will be brought into closer mesh with the driving gears or pinions 28, 29. In like manner, an adjustment of the planetary gears toward the driving gear or pinion 29 is provided for by the bearing 34 and washers 35 by inserting an additional washer or washers between the front end of the cap or casing 2 and said bearing. Then, by tightening the bolts 15, the flange 4 and cage 7 are adjusted rearwardly, bringing the planetary gears into closer mesh with the driving pinion 29.

By the construction herein described, I have produced a differential mechanism which is particularly simple in construction, easily assembled, and efficient in operation. The driving gears 27, 28 and 29, the shaft 25, and the cage 7 are very light and cheap of production, enabling duplicates to be carried.

While my invention is peculiarly adapted to automobiles, it will be evident that it is not limited in its application to any one class of devices, but is capable of general employment wherever it may be desirable or necessary to use differential mechanism.

Having thus described my invention what I claim as new and desire to secure by Letters-Patent is:—

1. The combination of a power or drive shaft, driven gears, a shaft intermediate said power or drive shaft and said driven gears, driving gears on said intermediate shaft, and differential mechanism comprising compensating gears mounted on said intermediate shaft, said compensating gears being driven by said power or drive shaft, substantially as specified.

2. The combination of a power or drive shaft, driven gears, a shaft intermediate said power or drive shaft and said driven gears, and differential mechanism comprising compensating gears mounted on said intermediate shaft and connected to and driven by said power or drive shaft, substantially as specified.

3. The combination of a power or drive shaft, driven gears, a shaft intermediate said power or drive shaft and said driven gears, driving gears on said intermediate shaft, and differential mechanism comprising compensating gears mounted on said intermediate shaft, said compensating gears being revolved orbitally at the same speed as the power or driving shaft, substantially as specified.

4. The combination of a power or drive shaft, driven members, a casing for said driven members, a shaft intermediate of said power or drive shaft and said driven members, said intermediate shaft being supported in alinement with said power or drive shaft, compensating mechanism on said intermediate shaft driven by said power or drive shaft, driving members on said intermediate shaft and operating said driven members, substantially as specified.

5. The combination of a power or drive shaft, driven members, a shaft intermediate said power or drive shaft and said members and in alinement with said power or drive shaft, driving members on said intermediate shaft, a casing for said driven members having a bearing therein for said intermediate shaft, and a cap inclosing said intermediate shaft and removably fitted to said casing, substantially as specified.

6. The combination of a power or drive shaft, driven members, a shaft intermediate said power or drive shaft and said members and in alinement with said power or drive shaft, casing sections for said driven members, one of said sections having a bearing for the intermediate shaft, a cap inclosing said intermediate shaft and removably fitted to the casing sections, and connections between said intermediate shaft and said driven members, substantially as specified.

7. The combination of a power or drive shaft, driven members, a shaft intermediate of said power or drive shaft and said members and in alinement with said power or drive shaft, casing sections for said driven members, one of said sections having a bearing for the intermediate shaft, a cap inclosing the end of the power or drive shaft and said intermediate shaft and removably fitted to the casing sections, and connections between said intermediate shaft and said driven members substantially as specified.

8. The combination of a power or drive shaft, driven members, driving members for said driven members, a cage removably fitted to the end of the power or drive shaft and operated by said shaft, and compensating mechanism carried by said cage and operating said driving members, substantially as specified.

9. The combination of a power or drive shaft, driven members, casing sections inclosing said driven members, driving members for said driven members, a cage operated by said power or drive shaft, compensating mechanism carried by said cage and operating said driving members, and a cap or casing section removably fitted to the end of the drive shaft and removably connected to the casing section, substantially as specified.

10. The combination of a power or drive shaft, driven gears, a shaft intermediate said power or drive shaft, and said driven gears, compensating mechanism driven by said power or drive shaft, and driving gears for said driven gears, one of said driving gears being operated by the intermediate shaft and said compensating mechanism operating said intermediate shaft and the other driving gear, substantially as specified.

11. The combination of a power or drive shaft, driven gears, a shaft intermediate said power or drive shaft and said driven gears, driving gears for said driven gears, one of the driving gears being loose on the intermediate shaft and the other driving gear being operated by said shaft, and compensating mechanism operated by the power or drive shaft and operating said intermediate shaft and the driving gear loose thereon, substantially as specified.

12. The combination of a power or drive shaft, a pair of driven gears, a shaft intermediate of said power or drive shaft and said driven gears, said intermediate shaft having adjacent one end a gear for rotating the same, driving gears for said driven gears, one of said driving gears being operated by said intermediate shaft and the other driving gear being loose thereon, compensating gears planetarily mounted on said shaft and operated by said power or drive shaft, said compensating gears meshing with the driving gear loose on said shaft and with the gear which operates said shaft, substantially as specified.

13. The combination of a power or drive shaft, driven members, a shaft intermediate said power or drive shaft and said driven members and in alinement with said power or drive shaft, driving members for said driven members, one of said driving members being mounted on the intermediate shaft adjacent the driven members and rotatable therewith, the other driving member being loosely mounted on said intermediate shaft and between the other driving member and the power or drive shaft, a gear mounted on the intermediate shaft adjacent the power or drive shaft for rotating said intermediate shaft, orbital gears mounted on said intermediate shaft between the last-mentioned gears and revolving with said power or drive shaft, substantially as specified.

14. The combination of a power or drive shaft, a pair of driven gears, a shaft intermediate said power or drive shaft and said driven gears, said intermediate shaft having one end rotatably and axially supported by the adjacent end of the power or drive shaft, means for supporting the other end of said intermediate shaft adjacent said driven gears, a pair of driving gears, one of said driving gears being mounted on said intermediate shaft adjacent the driven gears and rotatable with said shaft and the other driving gear being loosely mounted on said shaft and between the other driving gear and the power or drive shaft, a gear mounted on the intermediate shaft adjacent the power or drive shaft for rotating said intermediate shaft, and compensating gears mounted on said intermediate shaft between the two last-mentioned gears and orbitally revolving with said power or drive shaft, substantially as specified.

15. The combination of a power or drive shaft having at one end thereof an axially arranged cylindrical bearing, driven members, a casing for said driven members having a bearing therein in alinement with the bearing in the end of the power or drive shaft, an intermediate shaft supported by said bearings, driving members on said intermediate shaft for operating said driven members, and compensating gears operated by said power or drive shaft and planetarily mounted on said intermediate shaft for operating said driving members, substantially as specified.

16. The combination of a power or drive shaft, driven gears, a shaft intermediate said power or drive shaft and said driven gears having one end removably and rotatably supported by and axially of said power or drive shaft and the other end removably supported adjacent said driven gears, said power or drive shaft being provided with an enlarged flange or end, a cage removably fitted to such enlarged end or flange and sleeve on said intermediate shaft, compensating gears within said cage, and driving gears on said intermediate shaft for operating said driven gears, substantially as specified.

17. In a differential mechanism, the combination of driving members, driven members operated by said driving members, compensating gears operating said driving members, and means for adjusting said members to compensate for the wear thereof, substantially as specified.

18. In a differential mechanism, the combination of a power or drive shaft, driven gears, a shaft intermediate said power or drive shaft and said driven gears, driving gears for said driven gears mounted on said shaft, compensating gears on said shaft, and means for adjusting said compensating and driving gears relatively to each other, substantially as specified.

19. In a differential mechanism, the combination of a pair of casing sections each provided with a recess therein, a bearing sleeve in each of said recesses, a space being provided between the end of each sleeve and the casing section for the reception of washers, driven gears within the said casing sections, said gears being each provided with a hub fitting in a bearing sleeve, driving gears meshing with said driven gears, and means for securing said casing sections together, substantially as specified.

20. In a differential mechanism, the combination of a power shaft having an enlarged driving end, a pair of driven members, a casing for said members, a shaft intermediate said power shaft and said driven members, driving gears on said shaft, a cage carried by the enlarged end of said power shaft and mounted on said intermediate shaft, compensating gears carried by said cage and in mesh with one of said driving gears, a bearing sleeve surrounding the power shaft in front of the enlarged end thereof, a casing inclosing the bearing sleeve, a washer space being provided between the end of such sleeve and the casing, and means for adjustably securing the last-mentioned casing to the driven gear casing, substantially as specified.

21. The combination of a power or drive shaft, driven members, driving members for said driven members, a cage removably fitted to the power or drive shaft and operated thereby, compensating mechanism carried by said cage and operating said driving members, and a casing inclosing said driving and driven members and the compensating mechanism, substantially as specified.

22. The combination of a power or drive shaft, driven members, driving members for said driven members, a cage removably fitted to the end of the power or drive shaft and operated by said shaft, compensating mechanism carried by said cage and operating said driving members, a casing for said driven members, and a cap removably fitted to said casing, said cap having a bearing for the power or drive shaft.

23. The combination of a pair of driven members, said members nesting one within the other, each member being provided with a driving surface near its outer periphery, both of said driving surfaces upon the members facing in the same direction, a pair of driving members coöperating with the driving surfaces upon the driven members, a drive shaft, and compensating mechanism intermediate the shaft and the driving members.

24. The combination of a plurality of driven members nested one within the other, a plurality of driving members engaging the driven members, a drive shaft, and a compensating mechanism intermediate the shaft and driving members, said compensating mechanism being mounted upon the drive shaft and orbitally revolved by and at the speed of said shaft.

In testimony whereof I affix my signature in the presence of two witnesses.

DAVID E. ROSS.

Witnesses:
SCOTT NELSON,
LYNN H. BORDNER.